Jan. 12, 1932.  A. G. RAYBURN  1,840,871
MECHANICAL TORQUE MULTIPLYING AND SPEED VARYING POWER TRANSMISSION
Original Filed April 21, 1926  2 Sheets-Sheet 2

Inventor
Alden G. Rayburn
William A. Strauch

By

Attorney

Patented Jan. 12, 1932

1,840,871

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

MECHANICAL TORQUE MULTIPLYING AND SPEED VARYING POWER TRANSMISSION

Application filed April 21, 1926, Serial No. 103,496. Renewed June 11, 1931.

The present invention relates to torque multiplying variable speed power transmissions.

More particularly the invention relates to torque multiplying and speed varying power transmissions of the type in which a part of the power is transmitted directly from the driving to the driven member and the remainder is diverted through a torque multiplying train; and in which the speed and torque variations within the limits of the apparatus may be made continuously without effecting a disconnection between the driving and the driven members. Transmissions of this general type utilizing fluid pumps and motors and known as differential hydraulic transmissions have been proposed, but, so far as known, no successful transmissions of this type in which the parts are entirely mechanical have been devised.

Accordingly, an object of my invention is to provide an improved and solely mechanical power transmission in which the torque and speed ratios of the driving and driven members may be varied within the limits of apparatus without effecting a disconnection between driving and driven members.

A further object of the invention is to provide an improved mechanical transmission in which a part of the power from the driving member is diverted through a torque multiplying and speed reducing mechanism to give the desired torque multiplication, and in which the parts rotate as a unit in direct transmission.

Still further objects of the invention are such as may be attained by a utilization of the various combinations, sub-combinations and principles hereinafter set forth in the various relations to which they may be adapted by those skilled in the art, and as are defined by the scope of the appended claims.

As shown in the drawings.

Figure 1:
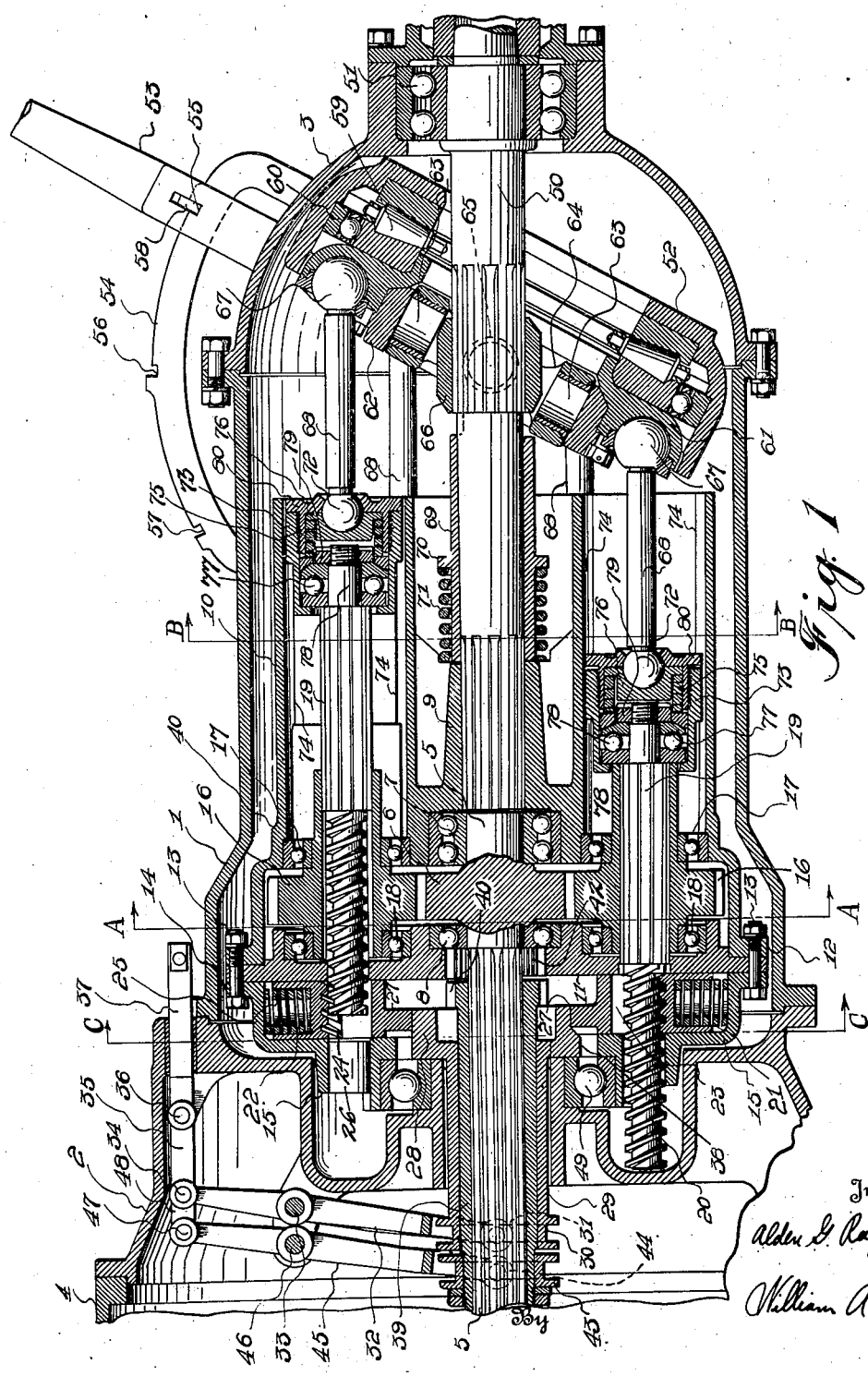
Figure 1 is a sectional elevation showing a preferred form of my invention.
Figure 2:
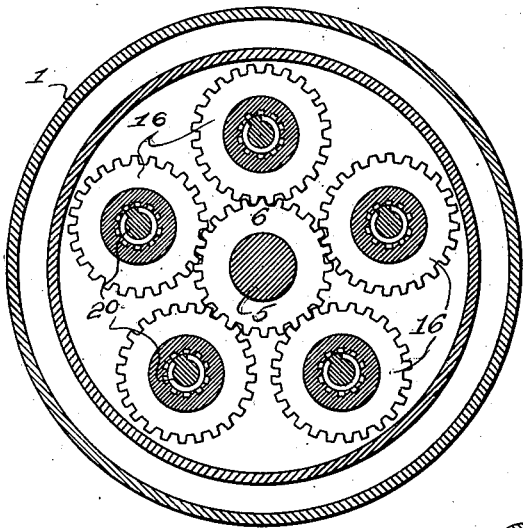
Figure 2 is a sectional view taken along line A—A of Figure 1.
Figure 3:
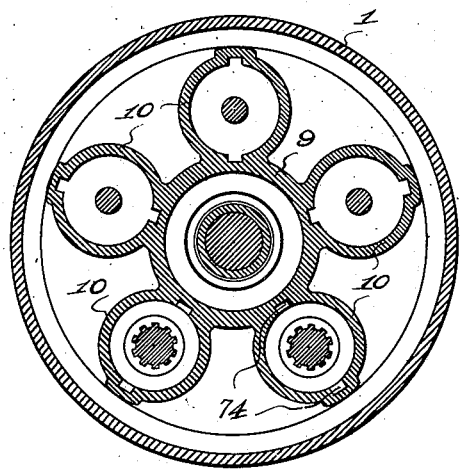
Figure 3 is a sectional view taken along line B—B of Figure 1.
Figure 4:
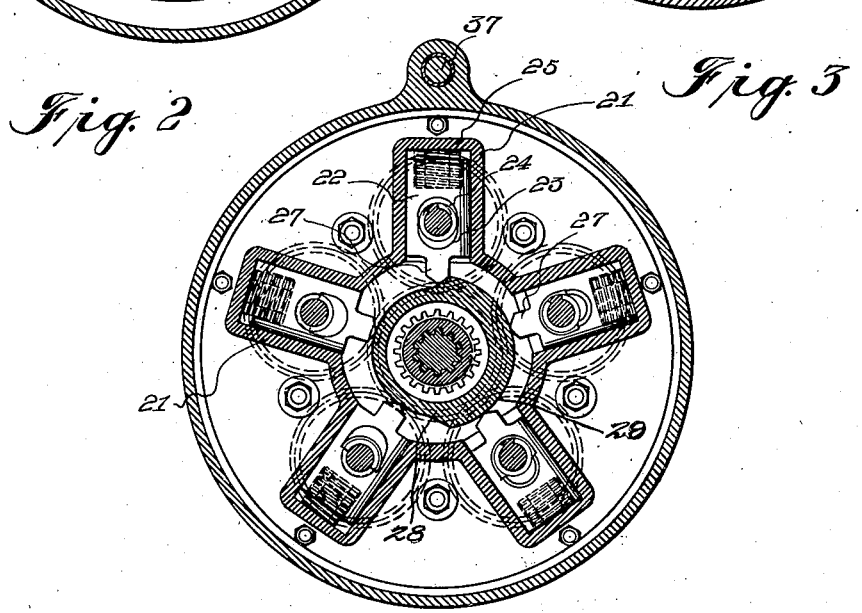
Figure 4 is a sectional view taken along line C—C of Figure 1.

Referring to Figure 1, a stationary cylindrical casing section 1 is provided to which the casing end sections 2 and 3 are secured in any suitable manner. The casing section 2 may be secured to or supported from the casing 4 of a suitable prime mover, such for example, as an automobile engine. A driving shaft 5 is coupled through a standard friction clutch and driven by the engine or prime mover. Formed integrally with the shaft 5 or secured thereto in any suitable manner is a central drive gear 6, and supporting the outer end of shaft 5 adjacent the central gear 6 are anti-friction or ball bearings 7 and 8. Bearing 7 is supported in a block or casting 9 on which the crosshead guideways 10 are integrally formed, and bearing 8 is supported in an end plate 11 secured to the flange 12 of the block 9 by means of securing bolts 13. Securing bolts 13 extend through the flange 14 of an end casting 15 and clamp the cylinder block 9, plate 11, and end casting 15 together as a unitary structure. Meshing with and equally spaced around the central gear 6 are the satellite gears 16 which are mounted for rotation in the ball bearings 17 and 18 supported respectively in the cylinder block 9 and the plate 11 with their axes of rotation in alignment with the centers of crosshead guideways. Slidably supported in suitable central splined bores of the gears 16 are the splined actuating rods or members 19. Formed integrally with the actuating members 19 and extending forwardly through the central bores of the gears 16 are the screw sections or members 20 upon which helical screw threads are formed. Slidably supported in radial guideways 21 (Figures 1 and 4) formed in the end casting 15 are the members 22 in which recesses 23 are formed through which the threaded extensions 20 are adapted to pass. Formed on each of the members 22 is a half threaded section 24 into which the threads on the extensions 20 fit. Helical springs 25 seated in suitable recesses in the sliding members 22 and with the outer ends thereof resting against the end walls of the guide ways 21 normally urge the members 22 inward to cause the threaded sections 24 to engage the threads of the extensions 20. Formed in the end casting 15 are the openings 26 through which the ends of the extensions 20 pass in operation of the device as will more fully hereinafter appear. Integrally formed on each of the members 22 is an actuating extension 27, the end of which is held against an operating cam 28 provided with a cam surface causing reciprocation of members 22 in operation. Cam member 28 is provided with a tubular extension 29 which is slidably keyed in a suitable bore formed in the stationary casing section 2. Formed on the extension 29 is an actuating groove 30 into which the actuating pins 31 of a shifting lever 32 extend. The shifting lever 32 is pivoted at 33 to an extension of the casing section 2 and at its upper end is connected by the pin 34 to one end of actuating link 35. Actuating link 35 at its opposite end is connected by means of pin 36 to an actuating rod or member 37 slidably supported in a suitable seat formed in the casing section 2. When the member 37 is actuated to shift the sleeve 29, together with the cam 28 to the right in Figure 1, all of the extensions 27 will be in engagement with the raised circular section 38 of the cam 28 moving all of the threaded sections 24 of the sliding members 22 out of engagement with the threaded sections 20 of the members 19 for a purpose which will more fully hereinafter appear.

Rotatably and slidably supported in the tubular extension 29 is a coupling sleeve member 39 which is slidably splined to the driving shaft section 5. Formed on one end of the sleeve 39 is a toothed coupling member 40 which when shifted to the right in Figure 1 is adapted to mesh with teeth 42 formed in the plate 11 to mechanically couple the shaft 5 and plate 11 and block 9 together. A shifting collar 43 is secured to the opposite end of the sleeves 39 in which the pins 44 of the shifting arm 45 extend. The shifting arm 45 is pivotally supported at 46 to an extension of casing section 2 and at its upper end is pivotally connected by a pin 47 to a shifting link 48 which at its opposite end may be connected by means of the pin 34 to move with the link 35 or may be connected to an independent actuating mechanism.

Casing section 15 is supported for rotation on a ball bearing 49 which in turn is supported from the casing section 2, and cylinder block 9 is slidably splined to one end of a tail or driven shaft 50, which at its other end is supported from casing 3 by the ball bearing 51. Journalled on suitable trunnions (not shown) in the casing section 3 is a backing plate 52 which is adapted to be shifted about its trunnions to vary the inclination thereof with respect to the vertical plane by a hand lever 53. Hand lever 53 is seated on a quadrant 54 secured to the casing sections 1 and 3 provided with the locking notches 55, 56 and 57. The hand or shift lever 53 is provided with a latch 58 operated by any suitable and well known mechanism, and which is adapted to seat in the notches 55 to 57 to lock the backing plate 52 in its vertical position and in its positions of maximum inclination with relation to the vertical. Supported in the backing plate 52 is a roller bearing 59 and a ball bearing 60 on which an angle plate structure 61 is rotatably supported. The angle plate structure 61 has rigidly secured thereto a ring 62 of a universal drive connection, provided with the diametrically opposed trunnions 63. Journalled on the trunnions 63 is the inner universal ring member 64 which connects the trunnions 63 to the trunnions 65 of a central drive member 66. The axes of the trunnions 65 are at right angles to the axes of the trunnions 63 and central drive member 66 is slidably splined to the tail or driven shaft 50. Secured to the angle plate 61 by means of ball and socket joints 67 are the actuating rods 68. The backing plate structure together with the structure of the rotating angle plate, the universal joint, and the rod connections are the same as are described in detail for the motor backing plate shown in my copending application Serial No. 58,806 filed September 26, 1925, and for a further detailed disclosure thereof reference may be had to my copending application. Interposed between the drive member 6 of the universal connection and the cylinder block 9 is a spacing sleeve 69 provided with a collar 70 and a helical spring 71 surrounding the spacing sleeve 69 and interposed between the cylinder block 9 and collar 70 normally holds the parts in assembled relation when no driving force is transmitted through the transmission. The forward ends of the rods 68 are connected by means of ball and socket joints 72 to the reciprocating crossheads 73 which are slidably keyed to and mounted for reciprocation in guideway 10 by means of the keyways 74 and suitable projections formed on the members 73. Seated in recesses in crossheads 73 are the coil springs 75 which yieldingly hold the seating members 76 of the ball and socket connections 72 in forward position. The opposite ends of the springs 75 rest against the thrust bearings 77 which are rigidly secured in the crossheads 73 and to which the ends of the rods 19 are secured by means of the extension 78 and the nuts 79. The socket joint 72 is held in position by the adjustable retainer 80 which is held in place by fitting into guideway 74 after assembling.

*Operation*

In operation of the device for the transmission of power with the parts in the position shown in Figure 1, a maximum torque multiplication will occur. As the shaft 5 is rotated by the prime mover, the central gear 6 will be driven and will rotate the satellite gears 16. Rotation of the satellite gears 16 rotates the splined members 19 together with the screw sections 20. The parts are so arranged that the threads 24 of the members 22 positioned on one side of the center of the shafts 5 and 50 will be in engagement with the screws on the sections 20, while the screw sections 24 of the members 22 on the other side of the center of the shafts 5 and 50 will be held out of engagement with the threads on the members 20 due to the fact that the projections 27 of the members 22 will be on the low and high parts of the cam 28 respectively. As a result, the screws 20 in engagement with the thread sections 24 will be forced to the right in Figure 1 exerting a pressure through the members 19, thrust bearings 77, springs 75, and rods 68 to the angle plate 61. Plate 61 will rotate with relation to the stationary backing plate 52 and will drive the central universal member, the trunnions 63 and 65 causing rotation of the shaft 50 in the same direction as shaft 5 is rotating. Rotation of the tail shaft 50 will rotate the block 9 and angle plate 61 together with the connected parts. As block 9 rotates and the guideways 10 pass beyond the vertical center of the shafts 5 and 50, the projections 27 of the members 22 will ride up on the high part of cam 28 throwing the threaded sections 24 of the respective members 22 out of engagement with the threaded sections 20 of the corresponding members 19 and the sections 20 together with members 19 and the crossheads 73 will be freed to move to the left in Figure 1. As the guideways 10 again pass beyond the vertical centers of the shafts 5 to 15, the members 27 will pass to the low part of the stationary cam 28 and the threads 24 will be moved into engagement with the threaded sections 20 by the springs 25. The corresponding members 19 together with the rods 68 will again be forced to the right, transmitting the driving forces to the plate 61 and the tail shaft 50. As the torque demands on the tail shaft decrease, lever 53 may be actuated to swing the backing plate 52 towards its vertical position. Movement of the backing plate 52 towards the vertical position will decrease the torque multiplication and will increase the speed ratio due to the decrease of angularity of the backing plate until when the backing plate is brought into vertical position, no torque multiplication will occur and the tail shaft 5 will be rotating at the same speed as the tail shaft 50. The transmission will then be in direct drive.

In order to reduce the wear on the parts when the transmission is in direct drive, and the prime mover can handle the load at the tail shaft without torque multiplication, sleeve 39 is shifted to the right in Figure 1 causing teeth 40 to engage teeth 42 of the plate 11 and coupling the tail shaft mechanically to the driving shaft through the plate 11 and cylinder block 9. At the same time cam 28 may be shifted to the right forcing members 22 outward until the threads 24 are out of engagement with the members 20 and no reciprocation of the members 22 occurs. When the tail shaft speed drops due to increase torque demands which cannot be handled by the prime mover, sleeves 29 and 39 are shifted to the left in Figure 1 and the lever 53 is shifted to incline the backing plate a sufficient amount with the vertical to give the necessary torque multiplication.

To effect a mechanical disconnection between the driving and driven shafts cam 28 may be shifted to the right in Figure 1 disengaging threads 24 and 20, and sleeve 39 may be shifted to the left disengaging teeth 40 and 42. By shifting the lever 53 and the backing plate 52 to counter clock-wise in Figure 1 to an opposite inclination with the vertical to that shown, tail shaft 50 will be driven in a reverse direction from the direction of rotation of the driving shaft 5.

When driving the tail shaft in the same direction as the driving shaft it will be noted that the reaction of the driving shaft on the block 9 aids the driving effect on the tail shaft while in reverse the driving reaction of the block opposes the rotation of the tail shaft. Accordingly, in reverse the torque multiplication for a given inclination with the vertical will not be as great as the torque multiplication for the same inclination in a forward direction.

It will be seen that a variable speed and torque multiplying transmission has been provided in which a continuous driving effect is maintained as the speed relations and torque of the driving and driven shaft are varied. Having described only a preferred embodiment of my invention, it will be apparent to those skilled in the art that a novel transmission has been provided in which wide variations may be made from the details disclosed without departing from the spirit of my invention. Accordingly, what is desired to be secured by Letters Patent and claimed as new is:

1. A mechanical transmission comprising a drive shaft, a driven shaft, and means rotatable with respect to said drive shaft to mechanically transmit the power of said drive shaft to the driven shaft, said means including mechanism to transmit a portion of said power through torque multiplying means and another portion directly to said driven shaft, said first named means being free except for its connection to said drive and driven shaft.

2. A mechanical transmission comprising a drive shaft; a driven shaft; and means rotatable with respect to said drive shaft to mechanically transmit the power of said drive shaft to the driven shaft, said last named means including mechanism for coupling said shafts together; said mechanism including gears one of which is operable by said drive shaft and the others of which are in driving engagement with said one gear and means interconnecting said other gears and said driven shaft; and adjustable mechanical means to vary the driving torque to meet various loads; said first named means being free except for its connection to said drive and driven shafts.

3. A mechanical transmission comprising a drive shaft, a gear fixed thereto, a driven shaft, a casing rotatably secured thereto, planetary gears mounted in said casing and meshing with said first named gear, and means coupling said gears to said driven shaft, said last named means including mechanism to multiply the torque from said drive shaft and apply it to said driven shaft and said mechanism being mounted to react upon said first named gear and casing to transmit a torque from said drive shaft directly to said driven shaft.

4. A mechanical transmission comprising a drive shaft, a gear fixed thereto, a driven shaft, a casing rotatably fixed thereto, planetary gears carried by said casing and meshing with said first named gear, whereby differential movement between said drive shaft and casing is permitted, and means connected to said planetary gears and operated thereby to transmit a multiplied torque from said drive to said driven shaft through said gears, said last named means including reciprocating elements, rods connected to said elements, and an angularly shiftable swash plate and means connected to said rods, under the control of the operator to shift said plate.

5. A mechanical transmission comprising a drive shaft, a gear fixed thereto, a driven shaft having its axis alined with the axis of said drive shaft, a casing fixed thereto, planetary gears carried by said casing and meshing with said first named gear, endwise movable shafts splined to said planetary gears, means to intermittently cause the rotation of said gears to shift said shafts endwise, and mechanism coupling said shafts to the driven shaft to transmit a multiplied torque thereto, said last named mechanism including an angularly shiftable plate arranged for control by the operator and connecting rods interposed between said shafts and said plate.

6. A mechanical transmission as defined in claim 5 in which an endwise yielding connection is embodied in the mechanism coupling the endwise movable shafts to the driven shaft.

7. A mechanical transmission comprising a drive shaft, a driven shaft axially alined with said drive shaft, a member secured to said driven shaft and differentially movable with respect to said drive shaft, and mechanical torque multiplying means including elements under the control of the operator carried by said member and connecting said drive and driven shafts, whereby said member reacts against said drive shaft so that a portion of the power of the drive shaft is transmitted to said driven shaft through said member and another portion is transmitted through said torque multiplying means.

8. A mechanical transmission as defined in claim 7 in which said elements are shiftable to a position in which no multiplied torque is transmitted.

9. A mechanical transmission including a drive shaft, a driven shaft axially alined with said drive shaft, and means coupling said shafts together, said last named means including a member rotatable with respect to said drive shaft and differentially connected thereto and directly connected to the driven shaft, and mechanism for multiplying the torque from said drive and transmitting it to said driven shaft through said member, said mechanism being carried by and bodily rotatable with said member, whereby the reaction resulting from the operation of said mechanism is transmitted directly to the driven shaft through said member.

10. A mechanical transmission comprising a drive shaft, a driven shaft, a member rotatably mounted relative to said drive shaft, slides in said member, mechanism on said member to mechanically reciprocate said slides successively upon rotation of said drive shaft and torque multiplying mechanism to cause said slides to directly actuate said driven shaft.

11. A mechanical transmission comprising a drive shaft and a driven shaft arranged in substantial alignment, a member rotatively mounted relative to said drive shaft and differentially driven thereby, torque multiplying mechanism carried by said member and mechanically actuated by said drive shaft and elements under the control of the operator to cause said mechanism to variably rotate said driven shaft at reduced speed, said elements and members being freely rotatable, the one relative to the other.

12. A mechanical transmission comprising a drive shaft, a driven shaft arranged in substantial alignment, a member rotatively mounted relative to said drive shaft and differentially driven thereby, torque multiplying mechanism carried by said member, 24. A mechanical transmission comprising a drive shaft, a driven shaft, a member for coupling said shafts end to end, said member being rotatable with respect to said drive shaft, a plurality of gears on said member, a gear on said drive shaft arranged between and meshing with said gears, a slide for each of said gears, a screw secured to each slide and a nut segment for each screw, a cam plate to actuate said nut members successively to reciprocate said slides, and mechanism to cause said slides to rotate the driven shaft.

25. A mechanical transmission such as defined in claim 24 in which said cam plate is shiftable axially of the drive shaft and provided with surfaces to simultaneously retract all of said nuts.

26. A mechanical transmission comprising a drive shaft; a member rotatably mounted for movement about the axis of said drive shaft, means operatively connecting said member and shaft including elements radially mounted in said member and driven by said drive shaft whereby they tend to cause rotation of said member with respect to said shaft in the normal direction of rotation of the latter, a driven shaft engaged by said member, and torque multiplying mechanism connected between said elements and said driven shaft to transmit the power exerted on said elements by said drive shaft to said driven shaft.

27. A mechanical transmission comprising a drive shaft, a block rotatably mounted for movement about the axis of said drive shaft, a gear on said drive shaft, rotatable satellite gears carried by said block and meshing with said first named gear so that said block tends to rotate bodily about the axis of said drive shaft by the operation thereof in the same rather than in the opposite direction thereto, a driven shaft connected to said block whereby said rotative tendency of the block causes the direct transmission of a portion of the power of the drive shaft to the driven shaft, and torque multiplying mechanism arranged between said block and driven shaft and actuated by the movement of said satellite gears to transmit another portion of the power of said drive shaft.

28. The combination defined in claim 26 in which said torque multiplying mechanism includes a plurality of reciprocable members, mounted in said member and operatively connected to said driven shaft, and elements to cause said reciprocating members to operate successively during each revolution of said member.

29. The combination defined in claim 26 including means to selectively directly couple said drive shaft and member for direct drive.

30. A mechanical transmission comprising a drive shaft; a driven shaft; and means rotatable with respect to said drive shaft to mechanically transmit the power of said drive shaft to the driven shaft, said last named means including mechanism for coupling said shafts together; said mechanism including gears one of which is operable by said drive shaft and the others of which are in driving engagement with said one gear, and means interconnecting said other gears and said driven shaft; said first named means being free except for its connection to said shafts.

In testimony whereof I affix my signature.
ALDEN G. RAYBURN.